(12) United States Patent
Go et al.

(10) Patent No.: US 11,063,908 B2
(45) Date of Patent: Jul. 13, 2021

(54) ON-VEHICLE COMMUNICATION DEVICE, COMMUNICATION CONTROL METHOD, AND COMMUNICATION CONTROL PROGRAM

(71) Applicants: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP); TOYOTA JIDOSHA KABUSHIKI KAISHA, Toyota (JP)

(72) Inventors: Darmawan Go, Osaka (JP); Hideki Maeda, Osaka (JP); Takeshi Hagihara, Yokkaichi (JP); Yasuhiro Yabuuchi, Yokkaichi (JP); Yasuhiro Yamasaki, Toyota (JP); Hiroya Ando, Toyota (JP); Toshio Kawamura, Toyota (JP); Hirofumi Urayama, Toyota (JP)

(73) Assignees: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/959,188

(22) PCT Filed: Aug. 30, 2019

(86) PCT No.: PCT/JP2019/034189
§ 371 (c)(1),
(2) Date: Jun. 30, 2020

(87) PCT Pub. No.: WO2020/095520
PCT Pub. Date: May 14, 2020

(65) Prior Publication Data
US 2020/0389436 A1 Dec. 10, 2020

(30) Foreign Application Priority Data
Nov. 5, 2018 (JP) .............................. JP2018-208370

(51) Int. Cl.
*G06F 15/16* (2006.01)
*G06F 9/54* (2006.01)
(Continued)

(52) U.S. Cl.
CPC ...... *H04L 63/0236* (2013.01); *B60R 16/0231* (2013.01); *H04L 45/745* (2013.01);
(Continued)

(58) Field of Classification Search
CPC .................................................. H04L 63/0236
(Continued)

(56) References Cited

U.S. PATENT DOCUMENTS

| 5,210,748 A * | 5/1993 | Onishi ................ H04L 12/4625 370/405 |
| 7,779,197 B1 * | 8/2010 | Norrie ................. G06F 13/4022 710/316 |

(Continued)

FOREIGN PATENT DOCUMENTS

| JP | 2002-152244 A | 5/2002 |
| JP | 2003-518788 A | 6/2003 |

(Continued)

OTHER PUBLICATIONS

J. Choi and B. Jung, "Design and Implementation of Packet Filtering Module for Vehicular Multi-domain Network," 2020 International Conference on Information and Communication Technology Convergence (ICTC), Jeju Island, 2020, pp. 1070-1072, doi: 10.1109/ICTC49870.2020.9289459. (Year: 2020).*

(Continued)

*Primary Examiner* — Hamza N Algibhah
(74) *Attorney, Agent, or Firm* — Oliff PLC

(57) ABSTRACT

This on-vehicle communication device includes: a storage unit configured to store correspondence information indicating a correspondence relationship between an address and a port number; and a communication unit configured to perform, by using the correspondence information, filtering of a packet having been received. A target port number which is a port number of a target instrument is registered in advance in the correspondence information. In the filtering, the communication unit selectively allows a packet that includes the target port number, to pass. The communication unit performs an address registration process of acquiring an (Continued)

address from the packet that includes the target port number and registering, into the correspondence information, the acquired address in association with the target port number. In the filtering after the address registration process, the communication unit selectively allows a packet that includes the target port number and the corresponding address, to pass.

7 Claims, 10 Drawing Sheets

(51) Int. Cl.
*H04L 29/06* (2006.01)
*B60R 16/023* (2006.01)
*H04L 12/741* (2013.01)
*H04L 29/12* (2006.01)
*H04L 29/08* (2006.01)

(52) U.S. Cl.
CPC .......... *H04L 61/2517* (2013.01); *H04L 63/08* (2013.01); *H04L 67/12* (2013.01)

(58) Field of Classification Search
USPC .......................................... 726/13
See application file for complete search history.

(56) References Cited

U.S. PATENT DOCUMENTS

| | | | | |
|---|---|---|---|---|
| 8,166,533 | B2* | 4/2012 | Yuan | H04L 63/029 726/11 |
| 8,229,087 | B2* | 7/2012 | Sumioka | H04L 47/14 379/88.13 |
| 8,804,537 | B2* | 8/2014 | Itoh | H04L 12/4625 370/242 |
| 9,497,168 | B2* | 11/2016 | Dingman | H04L 65/1006 |
| 9,794,173 | B2* | 10/2017 | Huang | H04L 45/64 |
| 10,021,034 | B2* | 7/2018 | Hong | H04L 45/24 |
| 2016/0173530 | A1 | 6/2016 | Miyake | |
| 2017/0093866 | A1* | 3/2017 | Ben-Noon | H04L 63/10 |
| 2017/0237769 | A1* | 8/2017 | Ookawa | H04L 63/1458 726/22 |
| 2018/0262466 | A1* | 9/2018 | Atad | H04L 67/12 |
| 2019/0079842 | A1* | 3/2019 | Chae | G05B 23/02 |
| 2020/0180530 | A1* | 6/2020 | Yasunori | B60R 16/0238 |

FOREIGN PATENT DOCUMENTS

| | | |
|---|---|---|
| JP | 2005-528054 A | 9/2005 |
| JP | 2013-168865 A | 8/2013 |
| WO | 01/031852 A1 | 5/2001 |
| WO | 2003/100652 A1 | 12/2003 |

OTHER PUBLICATIONS

"International Standard ISO13400-2", [online], [searched on Aug. 30, 2018], the Internet <URL:https://www.sis.se/api/document/preview/914803/>.
"International Standard ISO13400-4", [online], [searched on Aug. 30, 2018], the Internet <URL:https://www.sis.se/api/document/preview/920321/>.
Nov. 19, 2019 International Search Report issued in International Patent Application No. PCT/JP2019/034189.

* cited by examiner

| VLAN | MAC | IP | Port | Action |
|---|---|---|---|---|
| DoIP | any | any | 13400 | pass |
| DoIP | any | any | OTHER THAN 13400 | block |
| L1 | MAC-A | IP-A | 10000 | pass |
| L1 | MAC-B | IP-B | 20000 | pass |
| L2 | MAC-C | IP-C | 30000 | pass |
| ⋮ | ⋮ | ⋮ | ⋮ | ⋮ |

ON-VEHICLE COMMUNICATION DEVICE, COMMUNICATION CONTROL METHOD, AND COMMUNICATION CONTROL PROGRAM

TECHNICAL FIELD

The present invention relates to an on-vehicle communication device, a communication control method, and a communication control program. This application claims priority on Japanese Patent Application No. 2018-208370 filed on Nov. 5, 2018, the entire content of which is incorporated herein by reference.

BACKGROUND ART

Japanese Laid-Open Patent Publication No. 2013-168865 (PATENT LITERATURE 1) discloses an on-vehicle network system as below. That is, an on-vehicle network system includes: an on-vehicle control device provided with a memory for storing definition data that defines a portion which is based on implementation on an on-vehicle network among communication protocols used on the on-vehicle network; and a communication protocol issue device configured to issue the definition data to the on-vehicle control device. When receiving a registration request that requests to allow the on-vehicle control device to participate in the on-vehicle network from a registration device for allowing the on-vehicle control device to participate in the on-vehicle network, after authenticating the registration device, the communication protocol issue device creates the definition data based on implementation on the on-vehicle network, and returns the definition data to the registration device. The registration device receives the definition data transmitted by the communication protocol issue device and requests the on-vehicle control device to store the received definition data in the memory. The on-vehicle control device receives the definition data from the registration device, stores the definition data in the memory, and communicates using the on-vehicle network in conformity with the communication protocol according to the portion defined by the definition data.

Meanwhile, "INTERNATIONAL STANDARD ISO13400-2", [online], [searched on Aug. 30, 2018], the Internet <URL:https://www.sis.se/api/document/preview/914803/>(NON PATENT LITERATURE 1), and "INTERNATIONAL STANDARD ISO13400-4", [online], [searched on Aug. 30, 2018], the Internet <URL:https://www.sis.se/api/document/preview/920321/>(NON PATENT LITERATURE 2) each disclose a technology related to DoIP (Diagnostics over Internet Protocol), which is a communication protocol for performing diagnosis on vehicles.

CITATION LIST

Patent Literature

PATENT LITERATURE 1: Japanese Laid-Open Patent Publication No. 2013-168865

Non Patent Literature

NON PATENT LITERATURE 1: "INTERNATIONAL STANDARD ISO13400-2", [online], [searched on Aug. 30, 2018], the Internet <URL:https://www.sis.se/api/document/preview/914803/>

NON PATENT LITERATURE 2: "INTERNATIONAL STANDARD ISO13400-4", [online], [searched on Aug. 30, 2018], the Internet <URL:https://www.sis.se/api/document/preview/920321/>

SUMMARY OF INVENTION (1) An on-vehicle communication device of the present disclosure is an on-vehicle communication device to be installed in a vehicle. The on-vehicle communication device includes: a storage unit configured to store correspondence information indicating a correspondence relationship between an address and a port number; and a communication unit configured to perform, by using the correspondence information in the storage unit, filtering of a packet having been received. A target port number which is a port number of a target instrument is registered in advance in the correspondence information. In the filtering, the communication unit selectively allows a packet that includes the target port number, to pass. The communication unit performs an address registration process of acquiring an address from the packet that includes the target port number and registering, into the correspondence information, the acquired address in association with the target port number, and in the filtering after the address registration process, the communication unit selectively allows a packet that has been received and that includes the target port number and the corresponding address, to pass.

(6) A communication control method of the present disclosure is a communication control method to be performed in an on-vehicle communication device to be installed in a vehicle. The communication control method includes the steps of: acquiring an address from a packet that includes a target port number which is a port number of a target instrument, and registering the acquired address in association with the target port number into correspondence information indicating a correspondence relationship between an address and a port number; and performing, by using the correspondence information, filtering in which a packet that has been received and that includes the target port number and the corresponding address is selectively allowed to pass.

(7) A communication control program of the present disclosure is a communication control program to be used in an on-vehicle communication device. The on-vehicle communication device is installed in a vehicle and includes a storage unit configured to store correspondence information indicating a correspondence relationship between an address and a port number. The communication control program is configured to cause a computer to function as a communication unit configured to perform, by using the correspondence information in the storage unit, filtering of a packet having been received. A target port number which is a port number of a target instrument is registered in advance in the correspondence information. In the filtering, the communication unit selectively allows a packet that includes the target port number, to pass. The communication unit performs an address registration process of acquiring an address from the packet that includes the target port number and registering, into the correspondence information, the acquired address in association with the target port number, and in the filtering after the address registration process, the communication unit selectively allows a packet that has been received and that includes the target port number and the corresponding address, to pass.

One mode of the present disclosure can be realized not only as an on-vehicle communication device including such a characteristic processing unit but also as an on-vehicle communication system including the on-vehicle communication device. One mode of the present disclosure can be realized as a semiconductor integrated circuit that realizes a part or the entirety of the on-vehicle communication device.

DESCRIPTION OF EMBODIMENTS

Figure 1:
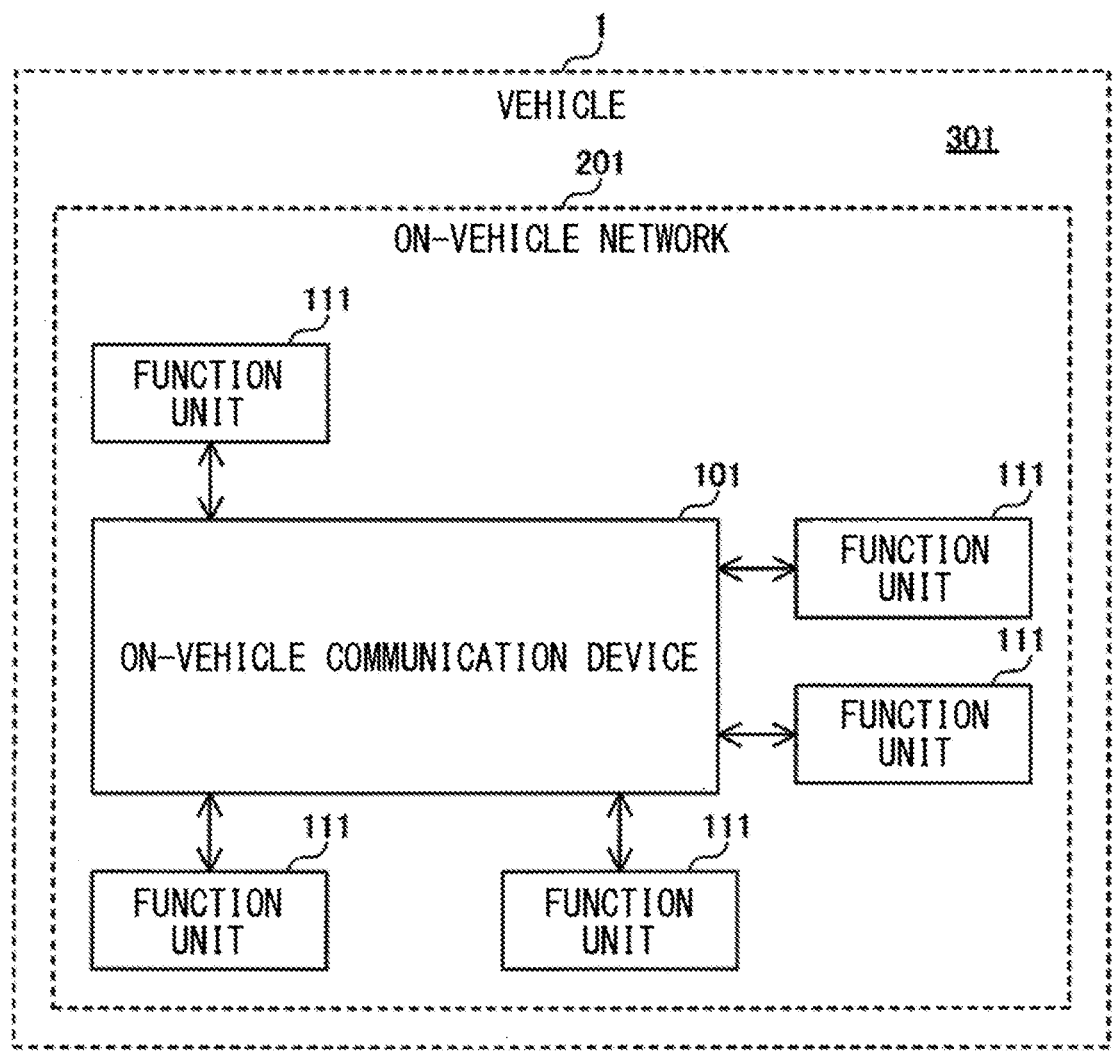
FIG. 1 shows a configuration of an on-vehicle communication system according to an embodiment of the present disclosure.

To date, on-vehicle network systems for improving security in on-vehicle networks have been developed.

Problems to be Solved by the Present Disclosure

For example, when a tool that uses DoIP is connected to an on-vehicle network, and communication is performed between the tool and a vehicle, diagnosis regarding the vehicle can be performed.

However, for example, when an unauthorized tool masquerading as an authorized tool is connected to an on-vehicle network, there is a possibility that the unauthorized tool cannot be detected and normal communication in the on-vehicle network cannot be ensured.

The present disclosure has been made in order to solve the above problem. An object of the present disclosure is to provide an on-vehicle communication device, a communication control method, and a communication control program that can improve security in an on-vehicle network.

Effects of the Present Disclosure

According to the present disclosure, security in an on-vehicle network can be further improved.

Description of Embodiment of the Present Disclosure

First, contents of embodiments of the present disclosure are listed and described.

(1) An on-vehicle communication device according to an embodiment of the present disclosure is an on-vehicle communication device to be installed in a vehicle. The on-vehicle communication device includes: a storage unit configured to store correspondence information indicating a correspondence relationship between an address and a port number; and a communication unit configured to perform, by using the correspondence information in the storage unit, filtering of a packet having been received. A target port number which is a port number of a target instrument is registered in advance in the correspondence information. In the filtering, the communication unit selectively allows a packet that includes the target port number, to pass. The communication unit performs an address registration process of acquiring an address from the packet that includes the target port number and registering, into the correspondence information, the acquired address in association with the target port number, and in the filtering after the address registration process, the communication unit selectively allows a packet that has been received and that includes the target port number and the corresponding address, to pass.

Thus, with the configuration in which filtering of a packet is performed by using a port number in addition to the address of the instrument, it is possible to determine a packet in which a correct address has been illegally used, for example. In addition, also in a phase where the address of the instrument is not yet acquired such as at the time of connection of the instrument to the on-vehicle network, it is possible to perform filtering of a packet by using the port number, and to perform filtering by further using the address acquired from the packet having the correct port number. Therefore, security in the on-vehicle network can be further improved.

(2) Preferably, the communication unit performs a connection process for establishing communication connection with the target instrument by using information included in the packet that includes the target port number and that has been allowed to pass, and the communication unit registers into the correspondence information the address included in the packet, in association with the target port number. After the communication connection has been disconnected, the communication unit deletes the address from the correspondence information.

With this configuration, for example, when the target instrument performs a connection process with the on-vehicle communication device again, and causes a packet to include an address different from the address included in the packet in the previous connection process, or when another target instrument different from the target instrument performs a connection process with the on-vehicle communication device, it is possible, in filtering the packet from the target instrument newly performing the connection process, to allow the packet to pass.

(3) Preferably, the communication unit performs an authentication process for a transmission source of the packet by using information included in the packet that includes the target port number and that has been allowed to pass, and the communication unit performs the address registration process when the authentication process has been successful.

With this configuration, for example, it is possible to determine a packet in which the target port number has been illegally used. Thus, security in the on-vehicle network can be further improved.

(4) Preferably, the communication unit performs a connection process for establishing communication connection with the target instrument by using information included in the packet that includes the target port number and that has been allowed to pass, and the communication unit permits the address registration process for one or a plurality of the target instruments until the number of the target instruments for which the communication connection has been established reaches a predetermined value.

With this configuration, the on-vehicle communication device can establish communication connection with a plurality target instruments in parallel.

(5) Preferably, a correspondence relationship between an address and a port number of an instrument different from the target instrument is registered in advance in the correspondence information.

With this configuration, for example, it is possible to determine a packet in which the address of an instrument installed in the vehicle is illegally used. Thus, security in the on-vehicle network can be further improved.

(6) A communication control method according to an embodiment of the present disclosure is a communication control method to be performed in an on-vehicle communication device to be installed in a vehicle. The communication control method includes the steps of: acquiring an address from a packet that includes a target port number which is a port number of a target instrument, and registering the acquired address in association with the target port number into correspondence information indicating a correspondence relationship between an address and a port number; and performing, by using the correspondence information, filtering in which a packet that has been received and that includes the target port number and the corresponding address is selectively allowed to pass.

Thus, with the method in which filtering of a packet is performed by using a port number in addition to the address of the instrument, it is possible to determine a packet in which a correct address has been illegally used, for example. In addition, also in a phase where the address of the instrument is not yet acquired such as at the time of connection of the instrument to the on-vehicle network, it is possible to perform filtering of a packet by using the port number, and to perform filtering by further using the address acquired from the packet having the correct port number. Therefore, security in the on-vehicle network can be further improved.

(7) A communication control program according to an embodiment of the present disclosure is a communication control program to be used in an on-vehicle communication device. The on-vehicle communication device is installed in a vehicle and includes a storage unit configured to store correspondence information indicating a correspondence relationship between an address and a port number. The communication control program is configured to cause a computer to function as a communication unit configured to perform, by using the correspondence information in the storage unit, filtering of a packet having been received. A target port number which is a port number of a target instrument is registered in advance in the correspondence information. In the filtering, the communication unit selectively allows a packet that includes the target port number, to pass. The communication unit performs an address registration process of acquiring an address from the packet that includes the target port number and registering, into the correspondence information, the acquired address in association with the target port number, and in the filtering after the address registration process, the communication unit selectively allows a packet that has been received and that includes the target port number and the corresponding address, to pass.

Thus, with the configuration in which filtering of a packet is performed by using a port number in addition to the address of the instrument, it is possible to determine a packet in which a correct address has been illegally used, for example. In addition, also in a phase where the address of the instrument is not yet acquired such as at the time of connection of the instrument to the on-vehicle network, it is possible to perform filtering of a packet by using the port number, and to perform filtering by further using the address acquired from the packet having the correct port number. Therefore, security in the on-vehicle network can be further improved.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

<Configuration and Basic Operation>

[Outline of On-Vehicle Communication System]

FIG. 1 shows a configuration of an on-vehicle communication system according to an embodiment of the present disclosure.

With reference to FIG. 1, an on-vehicle communication system 301 includes an on-vehicle communication device 101 and a plurality of function units 111. The on-vehicle communication system 301 is installed in a vehicle 1.

Each function unit 111 is, for example, an automated driving ECU (Electronic Control Unit), a sensor, a navigation device, a TCU (Telematics Communication unit), a human machine interface, a camera, or the like, and can communicate with the on-vehicle communication device 101.

The on-vehicle communication device 101 and each function unit 111 are connected to each other by, for example, an on-vehicle Ethernet (registered trademark) communication cable (hereinafter, also referred to as Ethernet cable).

The on-vehicle communication device 101 and the function unit 111 communicate with each other by using an Ethernet cable. Information is communicated between the on-vehicle communication device 101 and the function unit 111, by using an Ethernet frame according to IEEE802.3, for example.

[Application Example of On-Vehicle Communication System]

Figure 2:
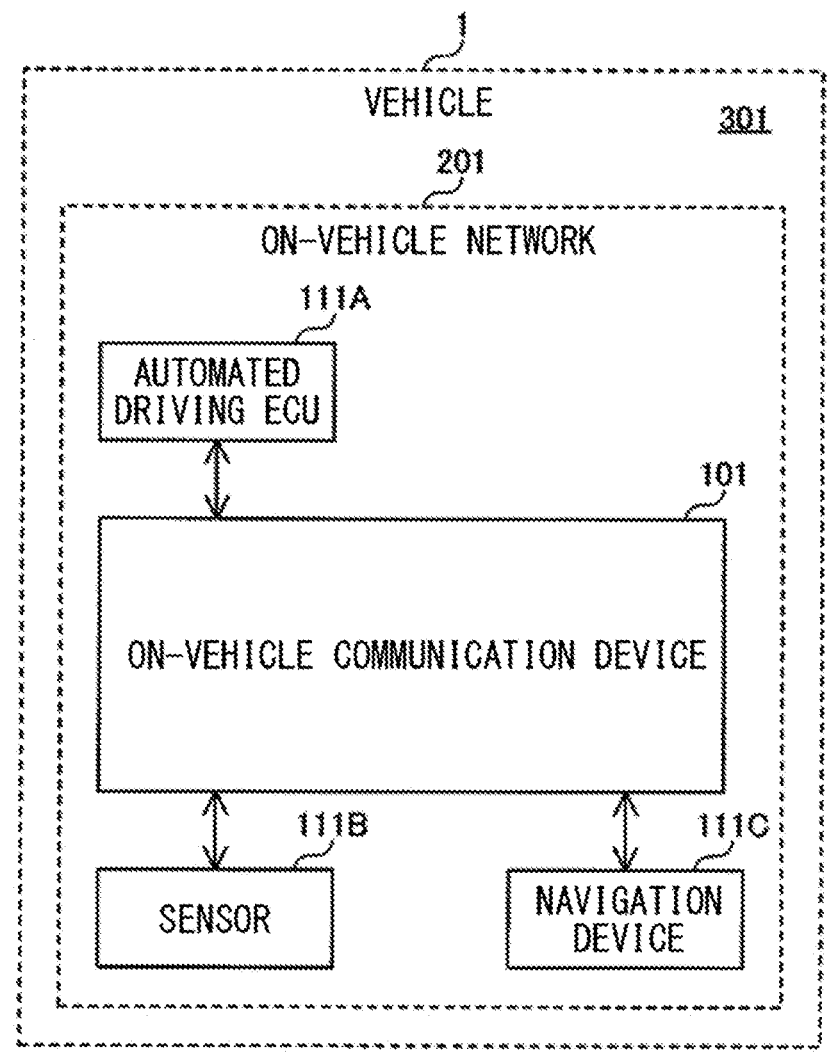
FIG. 2 shows an application example of the on-vehicle communication system according to the embodiment of the present disclosure.

FIG. 2 shows an application example of the on-vehicle communication system according to the embodiment of the present disclosure.

In FIG. 2, an automated driving ECU 111A, a sensor 111B, and a navigation device 111C are shown as specific examples of the function unit 111. Each of the automated driving ECU 111A, the sensor 111B, and the navigation device 111C is connected to a communication port (not shown) in the on-vehicle communication device 101.

The on-vehicle communication system 301 may not necessarily include three function units 111, and may include two, four, or more function units 111.

In the on-vehicle network 201, information is transmitted/received by using an IP packet, for example. The IP packet is stored in an Ethernet frame and transmitted.

For example, the on-vehicle communication device 101 is an on-vehicle gateway device, and performs a relay process of relaying data between function units 111 in the on-vehicle network 201. That is, the on-vehicle communication device 101 relays an Ethernet frame transmitted among the automated driving ECU 111A, the sensor 111B, and the navigation device 111C.

Specifically, the sensor 111B periodically performs sensing for an object around the vehicle 1, for example, and creates an IP packet that includes sensor information indicating a sensing result, and stores the IP packet in an Ethernet frame. In the IP packet, for example, an IP address of the sensor 111B and an IP address of the automated driving ECU 111A are included as a transmission source IP address and a transmission destination IP address, respectively.

For example, the sensor 111B writes, into the Ethernet frame, a MAC address of the automated driving ECU 111A and a MAC address of the sensor 111B as a transmission destination MAC address and a transmission source MAC address, respectively.

Then, the sensor 111B transmits the Ethernet frame in which the transmission destination MAC address and the transmission source MAC address have been written, to the on-vehicle communication device 101.

Upon receiving the Ethernet frame from the sensor 111B, the on-vehicle communication device 101 performs a relay process for the received Ethernet frame, thereby transmitting the Ethernet frame to the automated driving ECU 111A.

For example, the automated driving ECU 111A acquires the sensor information from the Ethernet frame received from the sensor 111B via the on-vehicle communication device 101, and controls driving of the vehicle 1 on the basis of the acquired sensor information.

[On-Vehicle Communication Device]

Comparative Example

Figure 3:
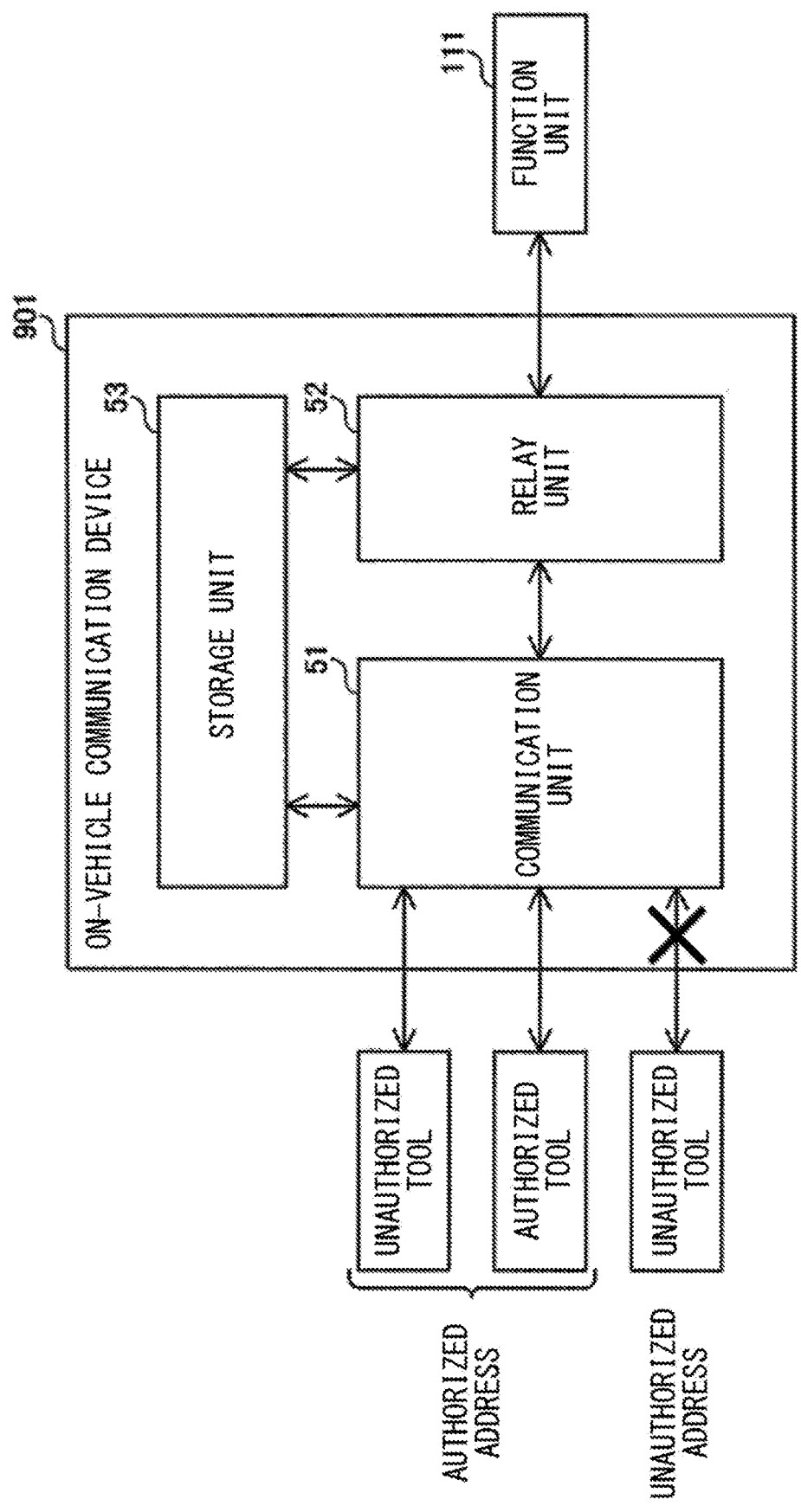
FIG. 3 shows a configuration of a comparative example of the on-vehicle communication device according to the embodiment of the present disclosure.

FIG. 3 shows a configuration of a comparative example of the on-vehicle communication device according to the embodiment of the present disclosure.

With reference to FIG. 3, an on-vehicle communication device 901 according to a comparative example includes a communication unit 51, a relay unit 52, and a storage unit 53.

(a) Relay Process

The communication unit 51 and the relay unit 52 perform a relay process of relaying data between function units 111 in the on-vehicle network 201.

A filtering table T9 is stored in the storage unit 53.

Figure 4:
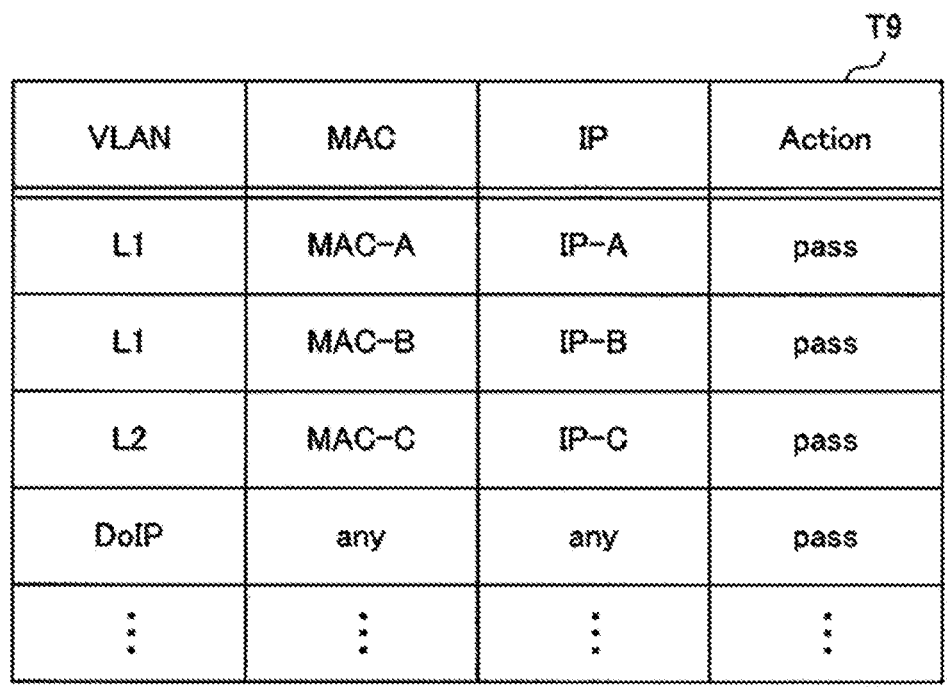
FIG. 4 shows an example of a filtering table stored in a storage unit in the on-vehicle communication device according to a comparative example.

FIG. 4 shows an example of a filtering table stored in the storage unit in the on-vehicle communication device according to the comparative example.

With reference to FIG. 3 and FIG. 4, the filtering table T9 includes correspondence information indicating a correspondence relationship between the MAC address and the IP address of each function unit 111 in the on-vehicle network 201.

More specifically, the filtering table T9 includes the correspondence relationship between the MAC address and the IP address of each function unit 111 and identification information of VLAN (Virtual Local Area Network) to which the function unit 111 belongs.

Specifically, "MAC-A" which is a MAC address and "IP-A" which is an IP address are registered as the address of a function unit 111A. In addition, "L1" is registered as the identification information of the VLAN to which the function unit 111A belongs, and it is registered that a packet that includes the MAC address "MAC-A" and the IP address "IP-A" is permitted to pass.

"MAC-B" which is a MAC address and "IP-B" which is an IP address are registered as the address of a function unit 111B. In addition, "L1" is registered as the identification information of the VLAN to which the function unit 111B belongs, and it is registered that a packet that includes the MAC address "MAC-B" and the IP address "IP-B" is permitted to pass.

"MAC-C" which is a MAC address and "IP-C" which is an IP address are registered as the address of a function unit 111C. In addition, "L2" is registered as the identification information of the VLAN to which the function unit 111C belongs, and it is registered that a packet that includes the MAC address "MAC-C" and the IP address "IP-C" is permitted to pass.

When the communication unit 51 has received an Ethernet frame from the function unit 111, the communication unit 51 refers to the transmission source MAC address and the transmission source IP address included in the received Ethernet frame.

When the set of the transmission source MAC address and the transmission source IP address included in the Ethernet frame is registered in the filtering table T9, the communication unit 51 outputs the Ethernet frame to the relay unit 52.

Meanwhile, when the set of the transmission source MAC address and the transmission source IP address included in the Ethernet frame is not registered in the filtering table T9, the communication unit 51 discards the Ethernet frame, for example.

Upon receiving the Ethernet frame outputted from the communication unit 51, the relay unit 52 performs a switching process of layer 2 or layer 3 by using the transmission destination MAC address, the transmission destination IP address, and the like included in the Ethernet frame, and transmits the Ethernet frame to the destination function unit 111.

(b) Address Registration Process

The on-vehicle communication device 901 further includes a port (hereinafter, also referred to as expansion port) that is used when a user adds a tool such as a function unit 111, for example. The expansion port is an open port in an initial state.

In FIG. 4, as shown in the filtering table T9, it is registered that, for example, when a tool that performs communication according to DoIP is connected to the on-vehicle network 201, a packet transmitted from the tool is permitted to pass. Specifically, for example, "DoIP" is registered in the item of the VLAN, and "any" that indicates no MAC address or IP address is specified is associated with "DoIP".

Here, a situation is assumed in which a new tool (hereinafter, also referred to as entry instrument) is connected to an expansion port. It is assumed that the IP address and the MAC address of the entry instrument are "IP-D" and "MAC-D", respectively.

For example, the entry instrument holds the IP address of the on-vehicle communication device 901 serving as a "default gateway", but does not hold the MAC address that corresponds to the IP address. In order to acquire the MAC address of the on-vehicle communication device 901, the entry instrument broadcasts an ARP (Address Resolution Protocol) request frame.

In this case, in the ARP request frame, set values of a transmission source hardware address, a transmission source protocol address, a transmission destination hardware address, and a transmission destination protocol address in a data field are "MAC-D", "IP-D", zero, and the IP address of the on-vehicle communication device 901.

When the communication unit 51 in the on-vehicle communication device 901 has received the ARP request frame from the entry instrument, the communication unit 51 recognizes that the destination of the ARP request frame is the on-vehicle communication device 901, because the transmission destination protocol address included in the ARP request frame is the IP address of the on-vehicle communication device 901.

Then, the communication unit 51 creates an ARP reply frame that includes the MAC address and the IP address of the on-vehicle communication device 901 as the transmission source hardware address and the transmission source protocol address, and transmits the created ARP reply frame to the entry instrument.

In addition, the communication unit 51 receives an Ethernet frame including a UDP (User Datagram Protocol) packet and the like and transmitted from the entry instrument. Then, on the basis of the received Ethernet frame, the communication unit 51 acquires the transmission source protocol address, i.e., "IP-D", and the transmission source hardware address, i.e., "MAC-D", and registers the set of the acquired addresses, in association with "DoIP" in the filtering table T9.

That is, the communication unit 51 changes the MAC address "any" to "MAC-D" and changes the IP address "any" to "IP-D" in the filtering table T9.

When the communication unit 51 has received a new packet after having performed the address registration process, the communication unit 51 refers to the filtering table T9, and selectively allows the packet to pass. After having performed the address registration of the entry instrument, the communication unit 51 permits passage of a packet from the entry instrument, i.e., a packet that includes the set of the MAC address and the IP address registered in the filtering table T9, and the communication unit 51 outputs the packet to the relay unit 52.

Upon receiving the packet outputted from the communication unit 51, the relay unit 52 transmits the packet to another function unit 111.

Description of Problem

For example, it is assumed that an unauthorized tool that masquerades as an authorized entry instrument (hereinafter, also referred to as target instrument) is connected to the on-vehicle network 201. In this case, the unauthorized tool has the set of the MAC address and the IP address of the target instrument, i.e., the set of the MAC address and the IP address registered in the filtering table T9.

Thus, the communication unit 51 in the on-vehicle communication device 901 permits a packet from the unauthorized tool to pass, and outputs the packet to the relay unit 52. Then, the relay unit 52 relays the packet received from the communication unit 51. As a result, the on-vehicle network 201 could be attacked and adverse influence could be caused.

The on-vehicle communication device 101 according to the embodiment of the present disclosure solves the above problem through the configuration and operation as below.

(On-Vehicle Communication Device According to the Embodiment of the Present Disclosure)

Figure 5:
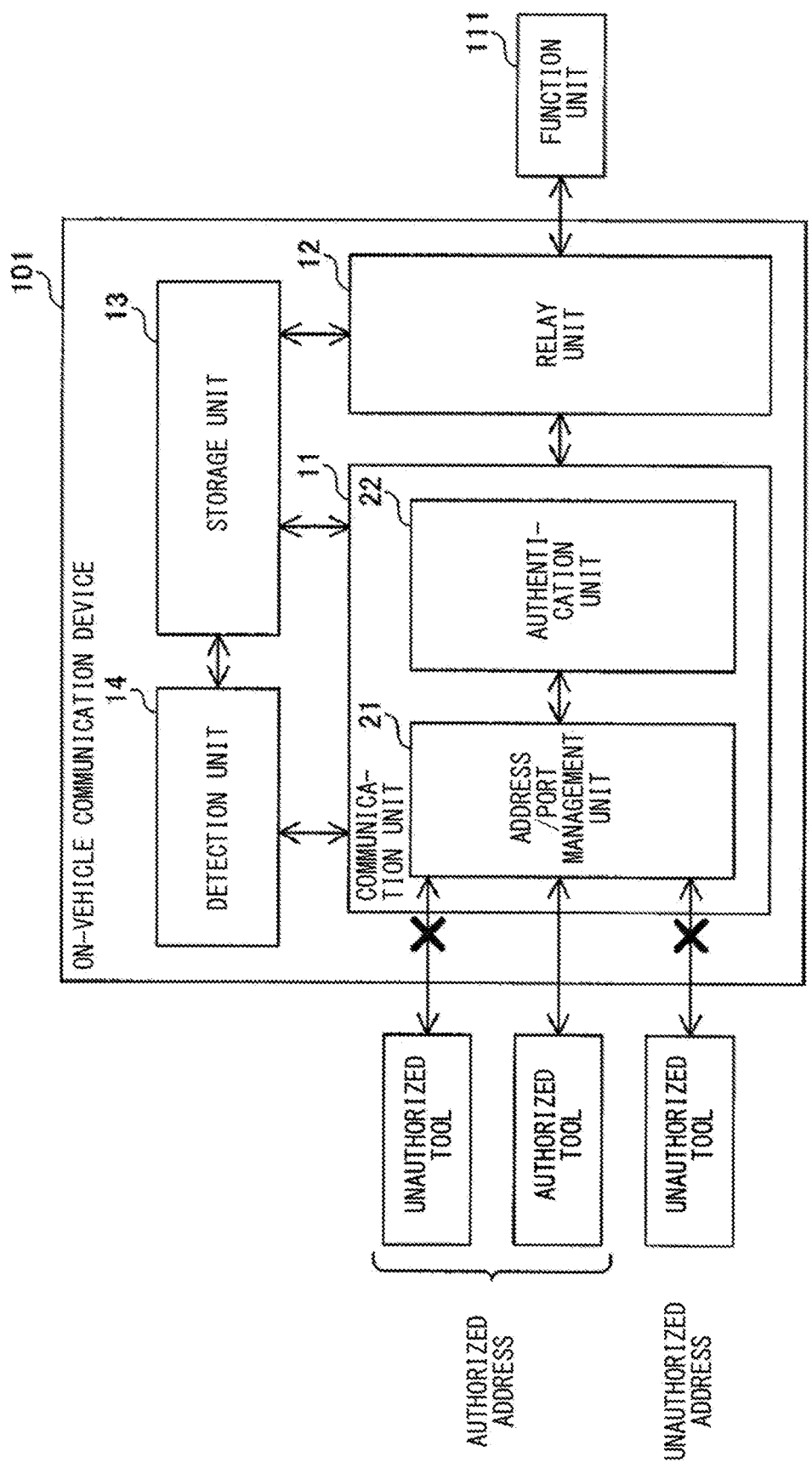
FIG. 5 shows a configuration of the on-vehicle communication device according to the embodiment of the present disclosure.

FIG. 5 shows a configuration of the on-vehicle communication device according to the embodiment of the present disclosure.

With reference to FIG. 5, the on-vehicle communication device 101 according to the embodiment of the present disclosure includes a communication unit 11, a relay unit 12, a storage unit 13, and a detection unit 14. The communication unit 11 includes an address/port management unit 21 and an authentication unit 22. A filtering table T1 is stored in the storage unit 13. The storage unit 13 is a nonvolatile memory, for example.

(a) Address Registration Process and Relay Process

Figure 6:
FIG. 6 shows an example of a filtering table before authentication stored in a storage unit in the on-vehicle communication device according to the embodiment of the present disclosure.

FIG. 6 shows an example of a filtering table before authentication stored in the storage unit in the on-vehicle communication device according to the embodiment of the present disclosure. FIG. 6 shows the content of the filtering table T1 in an initial state at the activation or the like of the on-vehicle communication device 101.

With reference to FIG. 5 and FIG. 6, the filtering table T1 includes correspondence information indicating a correspondence relationship between an address and a logical port number. A target port number, which is the logical port number of a target instrument, is registered in advance in the filtering table T1.

Here, the target instrument is an entry instrument that is connected to an expansion port in the on-vehicle communication device 101, and is a diagnostic tool that performs communication according to DoIP. In addition, the target port number is a logical port number of L4 (layer 4), and is assumed to be "13400".

More specifically, in the filtering table T1, for example, it is registered that a packet that is communicated in accordance with DoIP and that includes a logical port number of "13400" is permitted to pass. In addition, it is registered that a packet that is communicated in accordance with DoIP and that includes a logical port number other than "13400" is not permitted to pass.

Meanwhile, a correspondence relationship between the address and the logical port number of instruments different from the target instrument is registered in advance in the filtering table T1.

Specifically, it is registered that a packet from a function unit 111 that belongs to a VLAN of "L1" and that includes "MAC-A", "IP-A", and "10000" as the MAC address, the IP address, and the logical port number, respectively, is permitted to pass.

It is registered that a packet from a function unit 111 that belongs to the VLAN of "L1" and that includes "MAC-B", "IP-B", and "20000" as the MAC address, the IP address, and the logical port number, respectively, is permitted to pass.

It is registered that a packet from a function unit 111 that belongs to the VLAN of "L2" and that includes "MAC-C", "IP-C", and "30000" as the MAC address, the IP address, and the logical port number, respectively, is permitted to pass.

The communication unit 11 performs filtering of received packets, by using the filtering table T1 stored in the storage unit 13. Specifically, in the filtering, the address/port management unit 21 in the communication unit 11 selectively allows a packet that includes the target port number, to pass. That is, the address/port management unit 21: refers to the filtering table T1; selects a packet that includes the target port number among the received packets; permits the selected packet to pass; and outputs the packet to the authentication unit 22.

The communication unit 11 performs a connection process for establishing communication connection with the target instrument, by using information included in the packet that includes the target port number and that has been allowed to pass. In addition, the communication unit 11 performs an address registration process for registering the address included in the packet into the correspondence information, in association with the target port number.

More specifically, when an entry instrument has been connected to the on-vehicle network 201, the address/port management unit 21 receives an ARP request frame broadcasted from the entry instrument.

When the address/port management unit 21 has received the ARP request frame from the entry instrument and has recognized that the destination of the ARP request frame is the on-vehicle communication device 101, the address/port management unit 21 creates an ARP reply frame. Then, the address/port management unit 21 transmits the created ARP reply frame, to the entry instrument, which is the transmission source of the ARP request frame.

The address/port management unit 21 receives an Ethernet frame that includes a UDP packet transmitted from the entry instrument, for example, and refers to the logical port number included in the UDP packet in the received Ethernet frame.

Then, when the logical port number is "13400", the address/port management unit 21 communicates an Ethernet frame that includes discovery information with the entry instrument, for example. Accordingly, a discovery process is performed between the on-vehicle communication device 101 and the entry instrument.

Meanwhile, when the logical port number is other than "13400", the address/port management unit 21 does not perform the discovery process with the entry instrument. Accordingly, communication connection between the on-vehicle communication device 101 and the entry instrument is prevented from being established, whereby an attack or the like by the entry instrument to the on-vehicle network 201 can be prevented. In this case, for example, the address/port management unit 21 outputs instrument information indicating the MAC address and the like of the entry instrument, to the detection unit 14.

Having received the instrument information outputted from the address/port management unit 21, the detection unit 14 detects that the entry instrument that is an unauthorized tool has been connected to the on-vehicle network 201. Then, for example, the detection unit 14 registers, into the storage unit 13, log information in which the content of the instrument information and the current time are associated with each other.

Meanwhile, when the discovery process with the on-vehicle communication device 101 has been completed, the entry instrument transmits a UDP packet or a TCP (Transmission Control Protocol) packet for authentication, to the on-vehicle communication device 101.

When the address/port management unit 21 in the on-vehicle communication device 101 has received the packet for authentication that includes the logical port number of "13400" and that has been transmitted from the entry instrument, the address/port management unit 21 outputs the packet to the authentication unit 22.

Upon receiving the packet outputted from the address/port management unit 21, the authentication unit 22 tries authentication of the entry instrument by using the packet.

When the authentication of the entry instrument has been successful, the authentication unit 22 transmits, to the entry instrument via the address/port management unit 21, a packet that includes response information indicating that the authentication has been successful. Accordingly, communication connection between the on-vehicle communication device 101 and the entry instrument is established.

In addition, the authentication unit 22 acquires an address included in the packet received from the entry instrument for which the authentication has been successful, and performs the address registration process of registering, into the correspondence information, the acquired address in association with the target port number.

Figure 7:
FIG. 7 shows an example of a filtering table after authentication stored in the storage unit in the on-vehicle communication device according to the embodiment of the present disclosure.

FIG. 7 shows an example of a filtering table after authentication stored in the storage unit in the on-vehicle communication device according to the embodiment of the present disclosure.

With reference to FIG. 7, specifically, the authentication unit 22 acquires, for example, "MAC-D1" which is the MAC address of the entry instrument for which the authentication has been successful, and "IP-D1" which is the IP address of the entry instrument in the filtering table T1. Then, the authentication unit 22 registers, into the filtering table T1, these acquired addresses in association with the logical port number of "13400".

When the communication unit 11 has received a new packet after having performed the address registration process, the communication unit 11 refers to the filtering table T1 in the filtering of the packet, and selectively allows the packet that includes the target port number and the corresponding addresses, to pass.

That is, when having received a new packet, the address/port management unit 21 permits passage of the packet that includes the MAC address, the IP address, and the logical port number that are registered in the filtering table T1, and the address/port management unit 21 outputs the packet to the relay unit 12.

With reference to FIG. 5 again, similar to the relay unit 52 in the on-vehicle communication device 901 according to the comparative example, when the relay unit 12 has received the packet outputted from the communication unit 11, the relay unit 12 performs a switching process of layer 2 or layer 3 by using the transmission destination MAC address, the IP address, and the like included in the packet, and transmits the packet to the destination function unit 111.

Meanwhile, when having failed in authentication of the entry instrument, the authentication unit 22 does not perform the address registration process. Thus, through filtering of the packet in the address/port management unit 21, the packet in which the address of the authorized entry instrument is illegally used, for example, can be prevented from being relayed.

(b) Deletion of Address

When the entry instrument is to disconnect communication connection with the on-vehicle communication device 101, the entry instrument transmits a packet that includes a disconnection request, to the on-vehicle communication device 101.

Upon receiving the packet including the disconnection request transmitted from the entry instrument, the address/port management unit 21 in the on-vehicle communication device 101 transmits, to the entry instrument, a packet that includes response information that permits disconnection of the communication connection, for example. Accordingly, the communication connection between the on-vehicle communication device 101 and the entry instrument is disconnected.

After the communication connection between the on-vehicle communication device 101 and the entry instrument has been disconnected, the address/port management unit 21 deletes the addresses of the entry instrument from the correspondence information. That is, the address/port management unit 21 deletes the MAC address "MAC-D1" and the IP address "IP-D1" associated with the target port number "13400" in the filtering table T1. Accordingly, in the filtering table T1, as shown in FIG. 6, the MAC address and the IP address associated with the target port number "13400" both return to "any".

Then, after deleting "MAC-D1" and "IP-D1" from the filtering table T1, in the filtering of a newly received packet, the address/port management unit 21 selectively allows a packet that includes the logical port number of "13400", to pass.

The address that is included in a packet when an entry instrument performs a connection process with the on-vehicle communication device 101 is often variable. That is, as for a target instrument that is an authorized entry instrument having been authenticated, after the communication connection with the on-vehicle communication device 101 has been disconnected, and when the target instrument performs a connection process with the on-vehicle communication device 101 again, the target instrument sometimes causes a packet to include an address different from the address included in the packet in the previous connection process.

In addition, another authorized entry instrument different from the target instrument, i.e., another authorized entry instrument having an address different from the target instrument sometimes performs a connection process with the on-vehicle communication device 101.

In these cases, if an address associated with the logical port number of "13400" remains in the filtering table T1, the authorized entry instrument that newly performs a connection process with the on-vehicle communication device 101 cannot establish communication connection with the on-vehicle communication device 101.

In contrast, as described above, after communication connection between the on-vehicle communication device 101 and the authenticated target instrument has been disconnected, the address/port management unit 21 deletes the addresses associated with the logical port number of "13400" in the filtering table T1. With this configuration, a packet from an authorized entry instrument that newly performs a connection process with the on-vehicle communication device 101 is permitted to pass, and the communication connection between the entry instrument and the on-vehicle communication device 101 can be established.

It should be noted that, after the communication connection between the on-vehicle communication device 101 and an entry instrument has been disconnected, the address/port management unit 21 may not necessarily delete the addresses of the entry instrument from the correspondence information. A configuration may be employed in which, even when the communication connection has been disconnected, the address/port management unit 21 does not delete the addresses of the entry instrument from the correspondence information.

In this case, for example, after the communication connection between the on-vehicle communication device 101 and the entry instrument has been disconnected, and when the address/port management unit 21 has newly received a packet that includes the target port number, the address/port management unit 21 allows the packet to pass, irrespective of the addresses included in the packet. Then, when the authentication unit 22 has succeeded in authentication of the entry instrument that is the transmission source of the packet, the authentication unit 22 updates the addresses associated with the target port number in the filtering table T1, to the addresses of the entry instrument, for example.

In the filtering table T1, the number of sets of the MAC address and the IP address that can be registered in association with the logical port number of "13400" may be a predetermined value of 2 or greater. In this case, the authentication unit 22 performs the address registration process of one or a plurality of target instruments, until the number of target instruments for which communication connection with the on-vehicle communication device 101 has been established, i.e., the number of target instruments that are the transmission sources of packets including the logical port number of "13400" and for which authentication has been successful, reaches a predetermined value.

Accordingly, the on-vehicle communication device 101 can establish communication connection with a plurality target instruments in parallel.

The authentication unit 22 may register, into the filtering table T1, either one of the MAC address and the IP address of the target instrument for which authentication has been successful. In this case, in the packet filtering after the address registration process by the authentication unit 22, the address/port management unit 21 selectively allows a packet that includes the MAC address or the IP address registered in the filtering table T1 and the logical port number of "13400", to pass.

The on-vehicle communication device 101 may not necessarily include the authentication unit 22, and a configuration in which the on-vehicle communication device 101 does not include the authentication unit 22 may be employed.

The on-vehicle communication device 101 may not necessarily include the detection unit 14, and a configuration in which the on-vehicle communication device 101 does not include the detection unit 14 may be employed.

<Operation Flow>

Each device in the on-vehicle communication system 301 includes a computer including a memory. An arithmetic processing unit such as a CPU in the computer reads out, from the memory, a program including a part or all of steps in the sequence diagram and executes the program. Programs of the plurality of devices can each be installed from outside. The programs of the plurality of devices are each distributed in a state of being stored in a storage medium.

Figure 8:
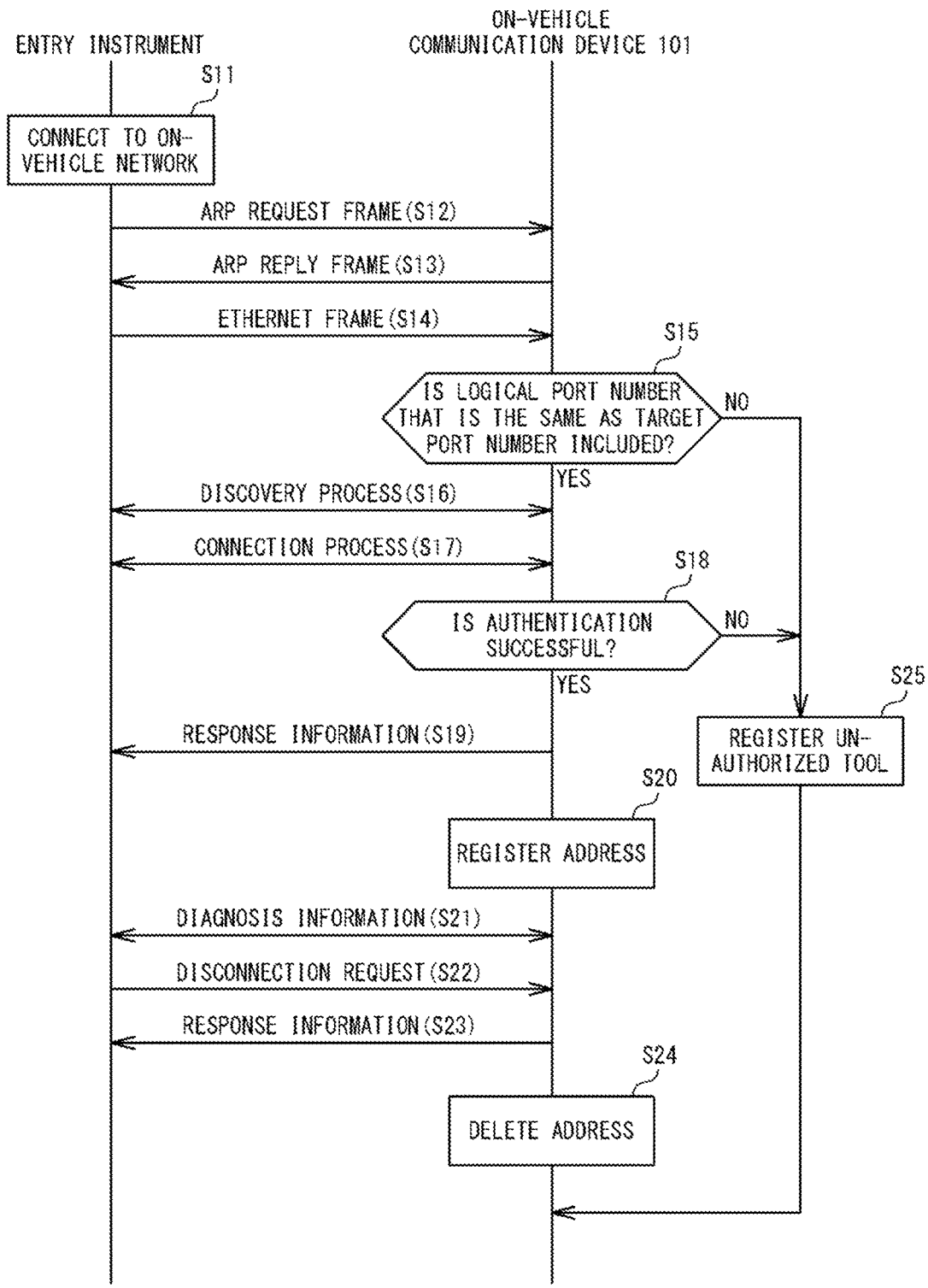
FIG. 8 is a sequence diagram showing a flow of information between an entry instrument and the on-vehicle communication device in the on-vehicle communication system according to the embodiment of the present disclosure.

FIG. 8 is a sequence diagram showing a flow of information between an entry instrument and the on-vehicle communication device in the on-vehicle communication system according to the embodiment of the present disclosure.

Here, it is assumed that, the filtering table T1 shown in FIG. 6 is already stored in the storage unit 13 at the activation of the on-vehicle communication device 101. It should be noted that the filtering table T1 may be created by the address/port management unit 21 or registered by a user, after activation of the on-vehicle communication device 101.

With reference to FIG. 8, first, when an entry instrument has been connected to the on-vehicle network 201 (step S11), the entry instrument broadcasts an ARP request frame (step S12).

Next, when the address/port management unit 21 in the on-vehicle communication device 101 has received the ARP request frame from the entry instrument, the address/port management unit 21 recognizes that the destination of the ARP request frame is the on-vehicle communication device 101, on the basis of the transmission destination protocol address included in the ARP request frame.

Then, the address/port management unit 21 creates an ARP reply frame that includes the MAC address and the IP address of the on-vehicle communication device 101, as the transmission source hardware address and the transmission source protocol address, respectively. Then, the address/port management unit 21 transmits the created ARP reply frame to the entry instrument which is the transmission source of the ARP request frame (step S13).

Next, the entry instrument receives the ARP reply frame transmitted from the on-vehicle communication device 101. Then, the entry instrument transmits, to the on-vehicle communication device 101, an Ethernet frame that includes an UDP packet, for example, by using the MAC address and the IP address of the on-vehicle communication device 101 included in the ARP reply frame (step S14).

Next, upon receiving the Ethernet frame from the entry instrument, the address/port management unit 21 in the on-vehicle communication device 101 confirms whether or not the logical port number included in the UDP packet in the received Ethernet frame is the same as the target port number, for example (step S15).

Then, when a logical port number that is the same as the target port number is included (YES in step S15), the address/port management unit 21 communicates an Ethernet frame that includes discovery information with the entry instrument. Accordingly, a discovery process is performed between the on-vehicle communication device 101 and the entry instrument (step S16).

Next, a connection process in which a packet for establishing communication connection, such as a packet for authentication, is communicated is performed between the on-vehicle communication device 101 and the entry instrument (step S17).

Next, when the packet from the entry instrument includes the target port number registered in the filtering table T1, the address/port management unit 21 in the on-vehicle communication device 101 outputs the packet to the authentication unit 22. Then, the authentication unit 22 tries authentication of the entry instrument by using the packet received from the address/port management unit 21 (step S18).

Next, when having been succeeded in the authentication of the entry instrument ("YES" in step S18), the authentication unit 22 transmits a packet that includes response information indicating that the authentication has been successful, to the entry instrument via the address/port management unit 21 (step S19). Accordingly, communication connection between the on-vehicle communication device 101 and the entry instrument is established.

Next, by using the packet received from the entry instrument, the authentication unit 22 performs the address registration process of registering the MAC address and the IP address of the entry instrument for which the authentication has been successful, in association with the target port number in the filtering table T1 (step S20).

It should be noted that, after transmitting the response information indicating that the authentication has been successful (step S19), the authentication unit 22 may transmit/ receive predetermined information for establishing communication connection with the entry instrument. In this case, the authentication unit 22 may perform the address registration process after the authentication of the entry instrument has been successful and before the communication connection between the on-vehicle communication device 101 and the entry instrument is established.

Next, for example, an Ethernet frame that includes diagnosis information to be used in diagnosis of the vehicle 1 is communicated between the on-vehicle communication device 101 and the entry instrument.

That is, the address/port management unit 21 in the on-vehicle communication device 101 outputs, to the relay unit 12, a packet that includes a set of the logical port number, the MAC address, and the IP address registered in the filtering table T1.

Then, the relay unit 12 performs a relay process of transmitting the Ethernet frame received from the address/ port management unit 21, to the function unit 111. The relay unit 12 may perform a relay process of relaying a packet transmitted from the function unit 111 to the entry instrument (step S21).

Next, when the entry instrument is to disconnect the communication connection with the on-vehicle communication device 101, the entry instrument transmits a packet that includes a disconnection request, to the on-vehicle communication device 101 (step S22).

Next, upon receiving the packet including the disconnection request transmitted from the entry instrument, the address/port management unit 21 in the on-vehicle communication device 101 transmits, to the entry instrument, a packet that includes response information that permits disconnection of the communication connection, for example (step S23). Accordingly, the communication connection between the on-vehicle communication device 101 and the entry instrument is disconnected.

Next, after the communication connection between the on-vehicle communication device 101 and the entry instrument has been disconnected, the address/port management unit 21 deletes the addresses of the entry instrument from the filtering table T1 (step S24).

Meanwhile, in step S15, when the logical port number included in the UDP packet in the Ethernet frame received from the entry instrument is different from the target port number ("NO" in step S15), the address/port management unit 21 does not perform the discovery process with the entry instrument. In this case, for example, the address/port management unit 21 outputs, to the detection unit 14, instrument information indicating the MAC address and the like of the entry instrument, and discards the packet from the entry instrument.

Then, upon receiving the instrument information outputted from the address/port management unit 21, the detection unit 14 detects that an entry instrument that is an unauthorized tool has been connected to the on-vehicle network 201, and registers, into the storage unit 13, log information in which the content of the instrument information and the current time are associated with each other, for example (step S25).

In step S18, when the authentication unit 22 has failed in authentication of the entry instrument using the packet from the address/port management unit 21 ("NO" in step S18), the authentication unit 22 outputs, to the detection unit 14, instrument information indicating the MAC address and the like of the entry instrument, and discards the packet from the entry instrument, for example.

Then, upon receiving the instrument information outputted from the authentication unit 22, the detection unit 14 detects that an entry instrument that is an unauthorized tool has been connected to the on-vehicle network 201, and registers, into the storage unit 13, log information in which the content of the instrument information and the current time are associated with each other, for example (step S25).

In step S21, when the packet received from the entry instrument does not include at least one of the target port number and the corresponding addresses, the address/port management unit 21 discards the packet.

When registering the log information into the storage unit 13, the detection unit 14 may notify an external device, a user, or the like of the content of the log information.

<Modification of On-Vehicle Communication Device>

The above-described on-vehicle communication device 101 according to the embodiment of the present disclosure performs the relay process of relaying data between function units 111 in the on-vehicle network 201. In contrast, an on-vehicle communication device 102 according to a modification of the embodiment of the present disclosure is an ECU of an automated driving ECU, a sensor, a navigation device, a TCU, a human machine interface, a camera, or the like, and does not perform the relay process.

Figure 9:
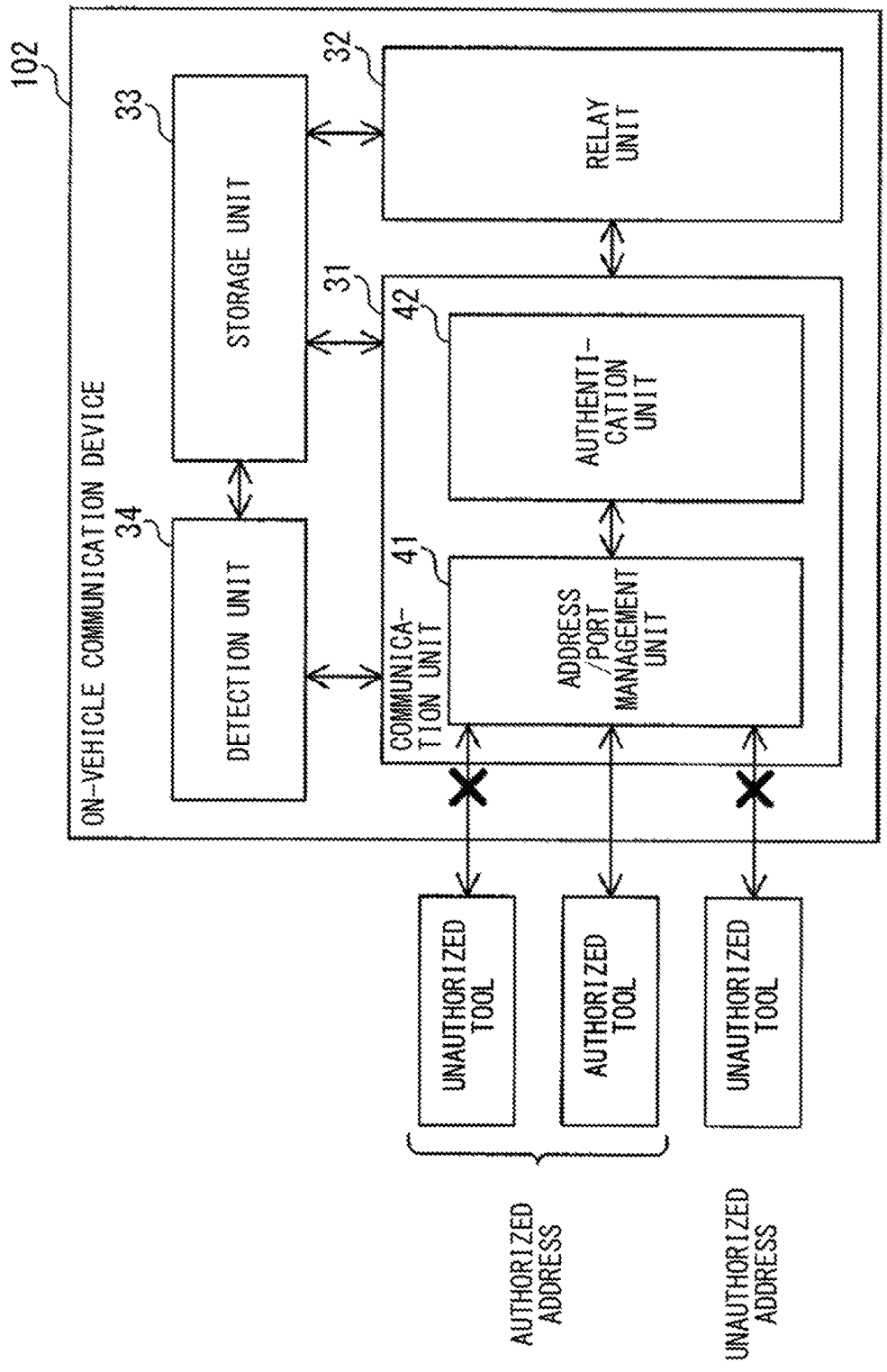
FIG. 9 shows a configuration of an on-vehicle communication device according to a modification of the embodiment of the present disclosure.

FIG. 9 shows a configuration of an on-vehicle communication device according to the modification of the embodiment of the present disclosure.

With reference to FIG. 9, the on-vehicle communication device 102 includes a communication unit 31, a processing unit 32, a storage unit 33, and a detection unit 34. The communication unit 31 includes an address/port management unit 41 and an authentication unit 42. A filtering table T2 is stored in the storage unit 33.

Figure 10:
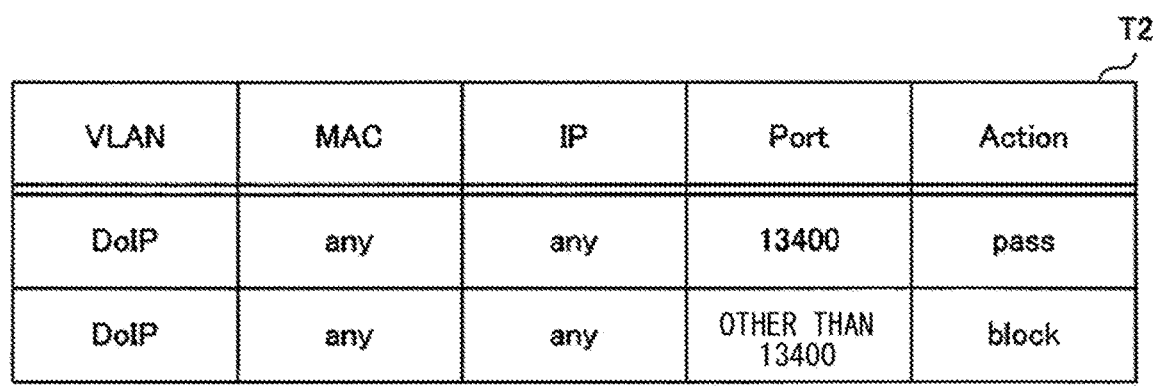
FIG. 10 shows an example of a filtering table stored in a storage unit in the on-vehicle communication device according to the modification of the embodiment of the present disclosure.

FIG. 10 shows an example of the filtering table stored in the storage unit in the on-vehicle communication device according to the modification of the embodiment of the present disclosure. FIG. 10 shows the content of the filtering table T2 in an initial state at the activation or the like of the on-vehicle communication device 102.

With reference to FIG. 9 and FIG. 10, a target port number, which is the logical port number of the target instrument, is registered in advance in the filtering table T2.

Specifically, in the filtering table T2, for example, it is registered that a packet that is communicated in accordance with DoIP and that includes a target port number of "13400" is permitted to pass. In addition, it is registered that a packet that is communicated in accordance with DoIP and that includes a logical port number other than "13400" is not permitted to pass.

Similar to the communication unit 11 shown in FIG. 5, the communication unit 31 performs filtering of received packets, by using the filtering table T2 stored in the storage unit 33.

That is, in the filtering of a packet received from the entry instrument, the address/port management unit 41 selectively allows a packet that includes the target port number, to pass, and the address/port management unit 41 outputs the packet to the authentication unit 42. The address/port management unit 41 discards a packet that does not include the target port number, and the address/port management unit 41 outputs, to the detection unit 34, instrument information indicating the MAC address and the like of the instrument that is the transmission source of the packet.

The authentication unit 42 tries authentication of the entry instrument by using the packet received from the address/port management unit 41, and performs the address registration process of registering, in the filtering table T2, the MAC address and the IP address of the entry instrument for which the authentication has been successful, in association with the logical port number of "13400".

The address/port management unit 41 outputs, to the processing unit 32, the packet including the logical port number of "13400", and the MAC address and the IP address registered in the filtering table T2 by the authentication unit 42.

Meanwhile, the address/port management unit 41 discards a packet that does not include the target port number, and at least one of the corresponding MAC address and IP address, and the address/port management unit 41 outputs, to the detection unit 34, instrument information indicating the MAC address and the like of the instrument that is the transmission source of the packet.

Upon receiving the instrument information outputted from the address/port management unit 41, the detection unit 34 detects that an entry instrument that is an unauthorized tool has been connected to the on-vehicle network 201. Then, for example, the detection unit 34 registers, into the storage unit 33, log information in which the content of the instrument information and the current time are associated with each other. The detection unit 34 may notify an external device, a user, or the like of the content of the log information.

After the communication connection between the on-vehicle communication device 102 and the entry instrument has been disconnected, the address/port management unit 41 deletes the MAC address and the IP address of the entry instrument from the filtering table T2.

When having received the packet outputted from the authentication unit 42, the processing unit 32 performs, by using the information included in the packet, various processes such as control of driving of the vehicle 1 in which the on-vehicle communication device 101 is installed.

It should be noted that the storage unit 13 in the on-vehicle communication device 101 according to the embodiment of the present disclosure shown in FIG. 5 may store the filtering table T2 as shown in FIG. 10. In addition, the storage unit 33 in the on-vehicle communication device 102 according to the modification of the embodiment of the present disclosure shown in FIG. 9 may store the filtering table T1 as shown in FIG. 6.

The on-vehicle communication device 102 may not necessarily include the detection unit 34, and a configuration in which the on-vehicle communication device 102 does not include the detection unit 34 may be employed.

Meanwhile, for example, when a tool that uses DoIP is connected to the on-vehicle network and communication is performed between the tool and the vehicle, diagnosis regarding the vehicle can be performed.

However, for example, when an unauthorized tool masquerading as an authorized tool is connected to the on-vehicle network, there is a possibility that the unauthorized tool cannot be detected and normal communication in the on-vehicle network cannot be ensured.

In contrast, in the on-vehicle communication device 101 according to the embodiment of the present disclosure, the storage unit 13 stores correspondence information indicating a correspondence relationship between an address and a port number. The communication unit 11 performs filtering of a received packet by using the correspondence information in the storage unit 13. A target port number which is the port number of a target instrument is registered in advance in the correspondence information. In the filtering, the communication unit 11 selectively allows a packet that includes the target port number, to pass. The communication unit 11 performs the address registration process of acquiring an address from the packet that includes the target port number and registering, into the correspondence information, the acquired address in association with the target port number, and in the filtering after the address registration process, the communication unit 11 selectively allows a packet that has been received and that includes the target port number and the corresponding address, to pass.

Thus, with the configuration in which filtering of a packet is performed by using a port number in addition to the address of the instrument, it is possible to determine a packet in which a correct address has been illegally used, for example. In addition, also in a phase where the address of the instrument is not yet acquired such as at the time of connection of the instrument to the on-vehicle network 201, it is possible to perform filtering of a packet by using the port number, and to perform filtering by further using the address acquired from the packet having the correct port number.

Therefore, in the on-vehicle communication device 101 according to the embodiment of the present disclosure, security in the on-vehicle network 201 can be further improved.

In the on-vehicle communication device 101 according to the embodiment of the present disclosure, the communication unit 11 performs a connection process for establishing communication connection with the target instrument by using information included in the packet that includes the target port number and that has been allowed to pass, and the communication unit 11 registers into the correspondence information the address included in the packet, in association with the target port number. After the communication connection with the target instrument has been disconnected, the communication unit 11 deletes the address from the correspondence information.

With this configuration, for example, when the target instrument performs a connection process with the on-vehicle communication device 101 again, and causes a packet to include an address different from the address included in the packet in the previous connection process, or when another target instrument different from the target instrument performs a connection process with the on-vehicle communication device 101, it is possible, in filtering the packet from the target instrument newly performing the connection process, to allow the packet to pass.

In the on-vehicle communication device 101 according to the embodiment of the present disclosure, the communication unit 11 performs an authentication process for a transmission source of the packet by using information included in the packet that includes the target port number and that has been allowed to pass, and the communication unit 11 performs the address registration process when the authentication process has been successful.

With this configuration, for example, it is possible to determine a packet in which the target port number has been illegally used. Thus, security in the on-vehicle network 201 can be further improved.

In the on-vehicle communication device 101 according to the embodiment of the present disclosure, the communication unit 11 performs a connection process for establishing communication connection with the target instrument by using information included in the packet that includes the target port number and that has been allowed to pass, and the communication unit 11 permits the address registration process for one or a plurality of the target instruments until the number of the target instruments for which the communication connection has been established reaches a predetermined value.

With this configuration, the on-vehicle communication device 101 can establish communication connection with a plurality target instruments in parallel.

In the on-vehicle communication device 101 according to the embodiment of the present disclosure, a correspondence relationship between an address and a port number of an instrument different from the target instrument is registered in advance in the correspondence information.

With this configuration, for example, it is possible to determine a packet in which the address of an instrument installed in the vehicle 1 is illegally used. Thus, security in the on-vehicle network 201 can be further improved.

In the communication control method according to the embodiment of the present disclosure, first, the communication unit 11 acquires an address from a packet that includes a target port number which is a port number of a target instrument, and registers the acquired address in association with the target port number into correspondence information indicating a correspondence relationship between an address and a port number. Next, the communication unit 11 performs, by using the correspondence information, filtering in which a packet that has been received and that includes the target port number and the corresponding address is selectively allowed to pass.

Thus, with the method in which filtering of a packet is performed by using a port number in addition to the address of the instrument, it is possible to determine a packet in which a correct address has been illegally used, for example. In addition, also in a phase where the address of the instrument is not yet acquired such as at the time of connection of the instrument to the on-vehicle network 201, it is possible to perform filtering of a packet by using the port number, and to perform filtering by further using the address acquired from the packet having the correct port number.

Therefore, in the communication control method according to the embodiment of the present disclosure, security in the on-vehicle network 201 can be further improved.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional note below.

[Additional Note 1]

An on-vehicle communication device to be installed in a vehicle, the on-vehicle communication device comprising:

a storage unit configured to store correspondence information indicating a correspondence relationship between an address and a port number; and a communication unit configured to perform, by using the correspondence information in the storage unit, filtering of a packet having been received, wherein a target port number which is a port number of a target instrument is registered in advance in the correspondence information, in the filtering, the communication unit selectively allows a packet that includes the target port number, to pass, the communication unit performs an address registration process of acquiring an address from the packet that includes the target port number and registering, into the correspondence information, the acquired address in association with the target port number, and in the filtering after the address registration process, the communication unit selectively allows a packet that has been received and that includes the target port number and the corresponding address, to pass, an address to be included in the packet when the target instrument performs a connection process for establishing communication connection with the on-vehicle communication device is variable, in the filtering, the communication unit discards a packet that does not include the target port number, after having performed the address registration process, the communication unit discards, in the filtering, a packet that does not include at least one of the target port number and the corresponding address, after the communication connection with the target instrument has been disconnected, the communication unit deletes the address from the correspondence information and, in the filtering, selectively allows a packet that includes the target port number, to pass, the on-vehicle communication device further includes a detection unit configured to detect that an unauthorized tool has been connected, when discarding a packet in the filtering, the communication unit outputs, to the detection unit, instrument information regarding a transmission source of the packet, and upon receiving the instrument information outputted from the communication unit, the detection unit detects that the unauthorized tool has been connected, and registers a content of the instrument information.

REFERENCE SIGNS LIST 1 vehicle
11, 31, 51 communication unit
12, 52 relay unit
13, 33, 53 storage unit
14, 34 detection unit
21, 41 address/port management unit
22, 42 authentication unit
32 processing unit
101, 102, 901 on-vehicle communication device
111 function unit
201 on-vehicle network
301 on-vehicle communication system

The invention claimed is:

1. An on-vehicle communication device to be installed in a vehicle, the on-vehicle communication device comprising:
a non-transitory computer readable memory; and
a communication interface including a communication port connected to a target instrument, wherein
the non-transitory computer readable memory stores correspondence information indicating a correspondence relationship between an address and a port number,
the communication interface includes a hardware processor coupled to the non-transitory computer readable memory and configured to perform, by using the correspondence information, filtering of a packet having been received by the communication interface,
a target port number which is a port number of the target instrument is registered in advance in the correspondence information,
in the filtering, the communication interface selectively allows a packet that includes the target port number, to pass, and
the communication interface performs an address registration process of acquiring an address from the packet that includes the target port number and registering, into the correspondence information, the acquired address in association with the target port number, and in the filtering after the address registration process, the communication interface selectively allows a packet that has been received and that includes the target port number and the corresponding address, to pass.

2. The on-vehicle communication device according to claim 1, wherein
the communication interface performs a connection process for establishing communication connection with the target instrument by using information included in the packet that includes the target port number and that has been allowed to pass, and the communication interface registers into the correspondence information the address included in the packet, in association with the target port number, and
after the communication connection has been disconnected, the communication interface deletes the address from the correspondence information.

3. The on-vehicle communication device according to claim 1, wherein
the communication interface performs an authentication process for a transmission source of the packet by using information included in the packet that includes the target port number and that has been allowed to pass, and the communication interface performs the address registration process when the authentication process has been successful.

4. The on-vehicle communication device according to claim 1, wherein
the communication interface performs a connection process for establishing communication connection with the target instrument by using information included in the packet that includes the target port number and that has been allowed to pass, and the communication interface permits the address registration process for one or a plurality of the target instruments until the number of the target instruments for which the communication connection has been established reaches a predetermined value.

5. The on-vehicle communication device according to claim 1, wherein
a correspondence relationship between an address and a port number of an instrument different from the target instrument is registered in advance in the correspondence information.

6. A communication control method to be performed in an on-vehicle communication device to be installed in a vehicle, the communication control method comprising the steps of:
acquiring an address from a packet that includes a target port number which is a port number of a target instrument, and registering the acquired address in association with the target port number into correspondence information indicating a correspondence relationship between an address and a port number; and
performing, by using the correspondence information, filtering in which a packet that has been received and that includes the target port number and the corresponding address is selectively allowed to pass.

7. A non-transitory computer readable storage medium storing a communication control program to be used in an on-vehicle communication device, the on-vehicle communication device being installed in a vehicle and including a storage unit configured to store correspondence information indicating a correspondence relationship between an address and a port number, the communication control program being configured to cause a computer to function as
a communication unit configured to perform, by using the correspondence information in the storage unit, filtering of a packet having been received, wherein a target port number which is a port number of a target instrument is registered in advance in the correspondence information, in the filtering, the communication unit selectively allows a packet that includes the target port number, to pass, and the communication unit performs an address registration process of acquiring an address from the packet that includes the target port number and registering, into the correspondence information, the acquired address in association with the target port number, and in the filtering after the address registration process, the communication unit selectively allows a packet that has been received and that includes the target port number and the corresponding address, to pass.

* * * * *